US008896709B2

(12) United States Patent
Drooker et al.

(10) Patent No.: US 8,896,709 B2
(45) Date of Patent: Nov. 25, 2014

(54) METHOD AND SYSTEM FOR IMAGE AND METADATA MANAGEMENT

(71) Applicant: Turner Broadcasting System, Inc., Atlanta, GA (US)

(72) Inventors: Matthew Drooker, Atlanta, GA (US); Brian K. O'Neil, Austell, GA (US); Christopher Grakal, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 189 days.

(21) Appl. No.: 13/726,934

(22) Filed: Dec. 26, 2012

(65) Prior Publication Data
US 2014/0176733 A1    Jun. 26, 2014

(51) Int. Cl.
*H04N 5/225*    (2006.01)
*G11B 27/00*    (2006.01)
*G06Q 50/00*    (2012.01)

(52) U.S. Cl.
CPC ................................. *G06Q 50/01* (2013.01)
USPC .................... 348/207.1; 348/207.11; 386/278

(58) Field of Classification Search
CPC   H04N 5/232; H04N 5/23203; H04N 5/23206
USPC ........................... 348/207.1, 207.11; 386/278
See application file for complete search history.

(56) References Cited

U.S. PATENT DOCUMENTS

2011/0197146 A1* 8/2011 Goto et al. ..................... 715/753
2013/0259446 A1* 10/2013 Sathish ......................... 386/278

* cited by examiner

*Primary Examiner* — Twyler Haskins
*Assistant Examiner* — Quang Le
(74) *Attorney, Agent, or Firm* — Arent Fox LLP

(57) ABSTRACT

A method and system for image and metadata management are described in which a server may communicate with multiple cameras from a single photographic session or shoot. The server may receive a digital image from one of the cameras and may attach metadata to the digital image. The digital image may also have embedded metadata as a result of the image capture process in the camera. The attached metadata may comprise session-specific metadata created in connection with the photographic session and stored in the server prior to the digital image being received. The attached metadata may comprise location-specific metadata that may be provided to the server by a photographer through a wireless device. The server may transmit the digital image and its metadata to one or both of a social media outlet and a website. The server may enable an approval and selection process of the digital image for transmission.

20 Claims, 28 Drawing Sheets

METHOD AND SYSTEM FOR IMAGE AND METADATA MANAGEMENT

CROSS-REFERENCE TO RELATED APPLICATIONS/INCORPORATION BY REFERENCE

Not applicable.

FIELD OF TECHNOLOGY

Certain embodiments of the invention relate to handling of digital images. More specifically, certain embodiments of the invention relate to a method and system for image and metadata management.

BACKGROUND

Runners are typically used to collect electronic cards with photographs that are taken during a photographic session. The runners then take the electronic cards to an editor to handle the photographs. This is a time-consuming process that results in slow availability and/or distribution of the photographic images.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for image and metadata management, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for image and metadata management. Various embodiments of the invention provide for a server that is operable to communicate with multiple cameras from a single photographic session or shoot. An example of a photographic session may be a social, political, business, or entertainment event or gathering in which one or more photographers are present to provide coverage of the activities and/or participants of the event or gathering. The photographers involved in the session may work together as part of a group; however, there may be instances when some or all of the photographers may operate independently.

The server may receive a digital image from one of the cameras and may attach metadata to the digital image. The cameras and the server may communicate through one or more networks. The digital image received by the server may have embedded metadata that is introduced into the digital image during the image capture process in the camera. The embedded metadata may comprise different types of information such as shutter speed, picture size, type of camera, focal length, and/or date/timestamp, for example. The metadata that is attached to the digital image in the server may comprise session-specific metadata created in connection with the photographic session and stored in the server prior to the digital image being received. The session-specific metadata may comprise information about the session name, the location of the session, date, copyright, and/or photographer's name, for example. The metadata that is attached to the digital image in the server may comprise location-specific metadata that may be provided to the server by a photographer through a wireless device and/or through the camera. For example, the photographer may provide information as to the activity and/or person(s) in a particular photograph, the specific location where the photograph was taken (e.g., building name, room, street), characteristics of the photograph (e.g., taken from ground level, taken from across the street), and the like. The photographer may access the server to review the digital images sent from his/her camera in order to provide the location-specific metadata for each of those digital images.

In some instances, the server may be operable to transmit a digital image and its attached metadata to a social media outlet such as Tweeter or Facebook, for example. The server may be operable to transmit the digital image and its metadata to a website where it can be accessed by, for example, different media entities that would like to utilize the digital image as part of a report or article related to the event or gathering. The server may also enable an approval and selection process of the digital image for transmission and/or distribution.

Figure 1:
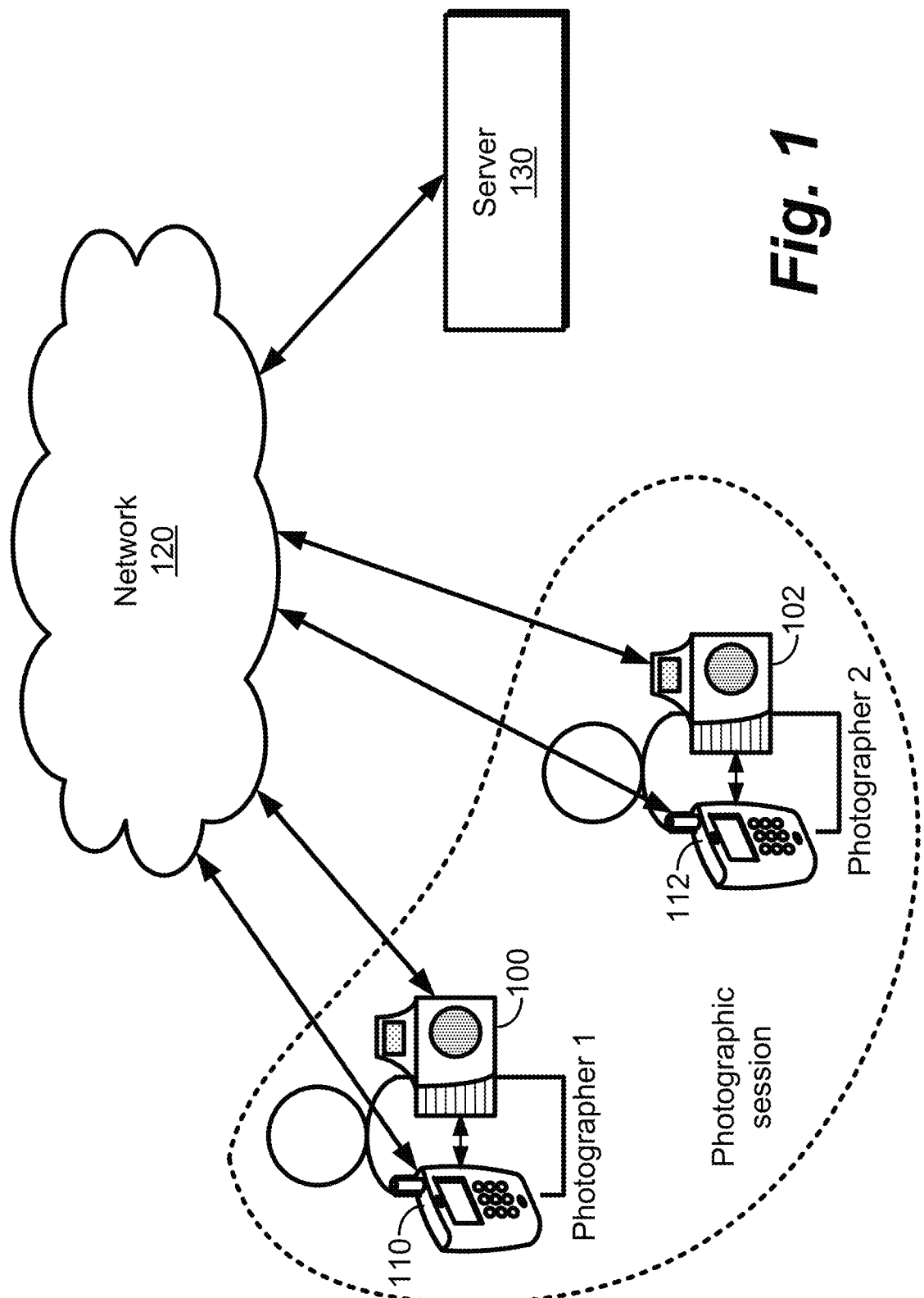
FIG. 1 is a diagram that illustrates exemplary image and metadata management operations in a photographic session, in accordance with an embodiment of the invention.

FIG. 1 is a diagram that illustrates exemplary image and metadata management operations in a photographic session, in accordance with an embodiment of the invention. Referring to FIG. 1, there is shown a first photographer (photographer 1) and a second photographer (photographer 2) that are taking part in the same photographic session. As described above, a photographic session may refer to an event or gathering in which one or more photographers are present to provide coverage of the activities and/or participants of the event or gathering. Photographer 1 is shown having a camera 100 and a mobile phone 110, while photographer 2 is shown having a camera 102 and a mobile phone 110. While the photographic session illustrated in FIG. 1 shows two cameras being utilized, the invention need not be so limited. The image and metadata management operations described herein may also be implemented in a photographic session in which more or fewer cameras are utilized.

Each of the cameras 100 and 102 may comprise suitable logic, circuitry, code, and/or interfaces that may be operable to perform image capture and processing operations. These cameras may be single-lens reflex (SLR) digital cameras such as those that are typically utilized by professional photographers in the type of photographic sessions described above. For each photograph taken, the image capture and processing operations may generate a digital image file, which may be referred to as a digital image, for example. Each of the cameras 100 and 102 may also be operable to perform video capture and video processing operations when a video mode of operation is enabled. For each video taken, the video capture and processing operations in the camera may generate in a digital video file, which may be referred to simply as a digital video, for example.

Each of the cameras 100 and 120 may also be operable to communicate with one or more devices and/or with one or more networks. For example, the camera 100 may be operable to communicate with a network 120 and/or with the mobile phone 110. The network 120 may comprise one or more networks that may operate together or separately to enable communication with a server 130. In this regard, the network 120 may support one or more wireless communication technologies and/or one or more wireline communication technologies.

Communication between the camera 100 and the network 120 may be through a WiFi connection or other similar wireless technology. For example, the camera 100 may be close to a WiFi hotspot and may utilize WiFi as a result of its proximity to the hotspot. Communication between the camera 100 and the mobile phone 110 may be through a short-range wireless technology or a personal area network (PAN) such as Bluetooth, IrDA, Wireless Universal Serial Bus (USB), and Zigbee, for example. The mobile phone 110 may comprise suitable logic, circuitry, code, and/or interfaces that may be operable to support PAN communication with the camera 100 and/or cellular communication with the network 120.

Communication between the camera 102 and the network 120 may be through a WiFi connection or other similar wireless technology. Communication between the camera 102 and the mobile phone 112 may be through a short-range wireless technology or a PAN, for example. The mobile phone 112 may comprise suitable logic, circuitry, code, and/or interfaces that may be operable to support PAN communication with the camera 102 and/or cellular communication with the network 120.

The network 120 may comprise suitable logic, circuitry, code, and/or interfaces that may be operable to support the type of wireless technology utilized by the cameras 100 and 102 and by the mobile phones 110 and 112. Moreover, the network 120 may be operable to support the type of communication technology utilized by the server 130.

The server 130 may comprise suitable logic, circuitry, code, and/or interfaces that may be operable to handle digital images and/or digital videos received from a photographic session. The server 130 may be operable to attach metadata to the digital images, to enable approval and/or selection of the digital images, and to enable the transmission of the digital images to certain destinations for distribution. The server 130 may be operable to handle multiple photographic sessions concurrently. Communication of data and/or other information may be performed through a file transfer protocol such as Hypertext Transfer Protocol (HTTP), for example.

In operation, photographer 1 may take one or more photographs during the photographic session. These photographs may cover certain areas and/or participants of the event. Once a number of photographs are taken, photographer 1 may select for transmission to the server 130 some of the digital images stored in the camera 100 corresponding to the photographs taken. The digital images may be sent to the server 130 through the network 120. In this regard, the camera 100 may be operable to send the digital images to the server 130 through, for example, a WiFi connection. The camera 100 may display a graphical user interface (GUI) or some other interface that enables the user, in this example photographer 1, to select and transmit the digital images. In another embodiment of the invention, the camera 100 may transfer the digital images to the mobile phone 110, which in turn may send the digital images to the server 130 through a cellular connection, for example. In this instance, the selection of the digital images may take place in the camera 100 or in the mobile phone 110, while the transmission to the server 130 is handled by the mobile phone 110. Photographer 1 may repeat the procedure of selecting and transmitting digital images to the server 130 more than once during the photographic session.

Photographer 2 may also take one or more photographs during the photographic session. The areas and/or participants covered by photographer 2 may be the same or different from those covered by photographer 1. Once a number of photographs are taken, photographer 2 may select, for transmission to the server 130, some of the digital images stored in the camera 102 corresponding to the photographs taken. In this regard, the processes by which those digital images are transmitted may be substantially similar to the ones described above with respect to photographer 1.

Each of the digital images generated by the cameras 100 and 102 may comprise metadata that is included into the digital image as part of the image capture and processing operations performed by the camera. The camera may embed or attach to each file metadata such as shutter speed, picture size, type of camera, focal length, and/or date/timestamp, for example. The metadata set that is included by the camera into a file may be programmable and may be modified by a user according to the type of event or gathering being covered by the photographic session.

Once digital images from one or both cameras have been received by the server 130 through the network 120, the server 130 may identify the digital images as being part of a particular photographic session and may be operable to attach additional metadata to the digital image files. In this regard, the server 130 may have stored metadata that corresponds to the photographic session and may attach that metadata automatically to each digital image it identifies as being part of the photographic session. The session-specific metadata may comprise copyright information, scene description, photographer name, photographic session name, date of photographic session, and/or photographic session location, for example.

Some time after the digital images are provided to the server 130, photographer 1 and/or photographer 2 may access their respective digital images in the server 130. In one example, photographer 1 may access the digital images in the server 130 through a client application in the mobile phone 110. Photographer 1 may then provide additional metadata to the server 130 to be attached to one or more of the accessed digital images. The metadata may describe specific information related to the content of each of the accessed digital images. For example, photographer 1 may provide metadata that includes, but need not be limited to, the name of one or more of the people in an image, the name of the building, room, or area where the image was taken, and/or the conditions under which the image was taken, to name a few. Moreover, the mobile phone 110 may provide location information, such as Global Positioning System (GPS) position, which photographer 1 may provide as metadata to be attached to the digital images in the server 130.

In another example, photographer 2 may access the digital images in the server 130 through the mobile phone 112 in a manner similar to that described above with respect to photographer 1. Moreover, when the camera 102 is operable to run or execute a client application that enables the camera 102 to interact with the contents stored in the server 130, photographer 2 may provide metadata to be attached to the appropriate digital images through the camera 102. In such an instance, the camera 102 may have the capability to obtain a GPS position to provide as metadata or may be able to receive a GPS position from the mobile phone 112 to provide as metadata.

Figure 2:
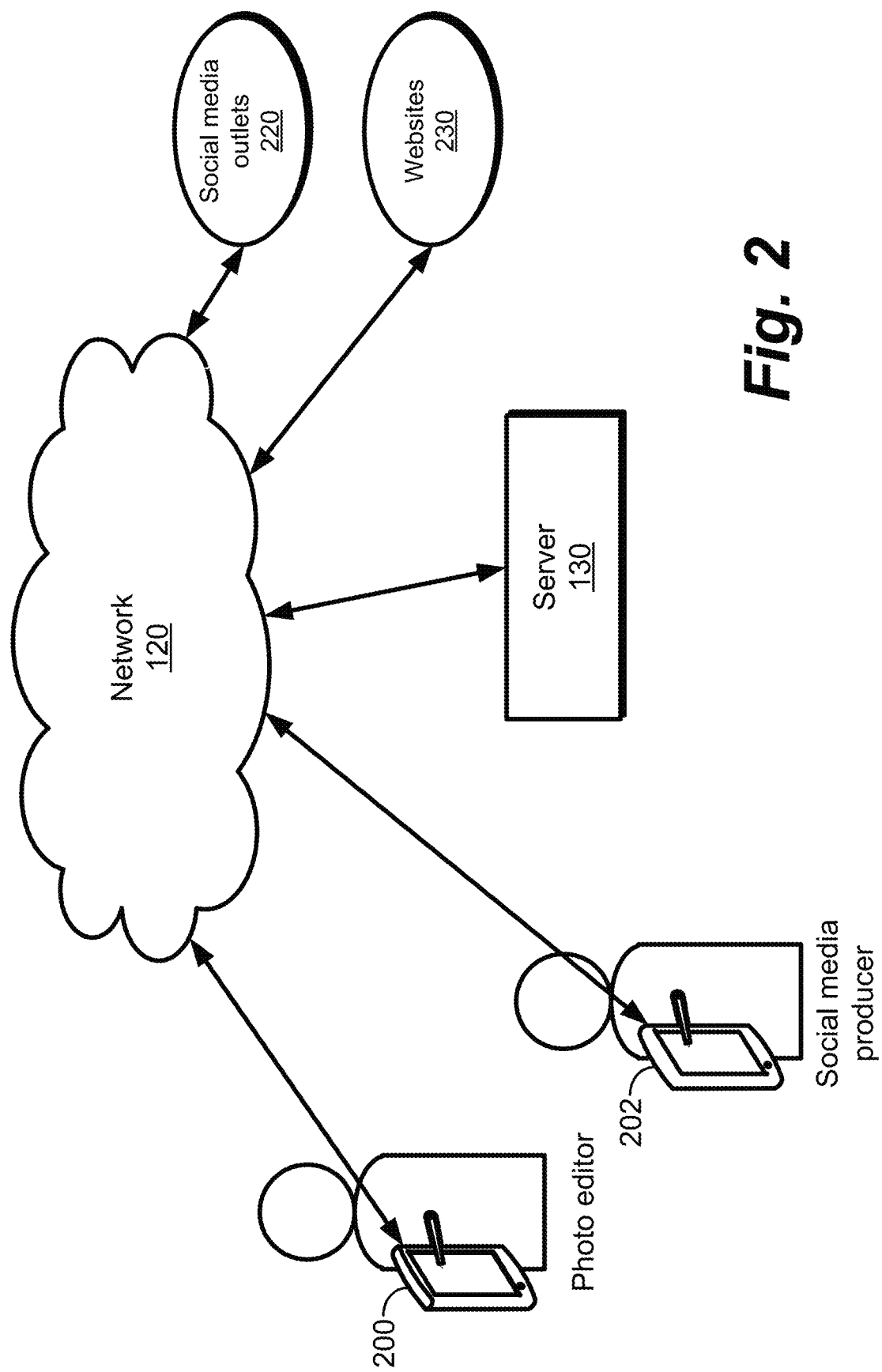
FIG. 2 is a diagram that illustrates exemplary editing and media production for image and metadata management operations in a photographic session, in accordance with an embodiment of the invention.

FIG. 2 is a diagram that illustrates exemplary editing and media production for image and metadata management operations in a photographic session, in accordance with an embodiment of the invention. Referring to FIG. 2, there are shown the network 120 and the server 130 described above with respect to FIG. 1. Also shown are a photo editor with a tablet device 200, a social media producer with a tablet device 202, social media outlets 220, and websites 230. The photo editor and the social media producer may participate in the photographic session described above by performing some back end operations on the digital images stored in the server 130. Unlike photographer 1 and photographer 2, which are present in the location where the photographic session is taking place, the photo editor and/or the social media producer may be present in a different location. In some instances, however, the photo editor and/or the social media producer may be at the photographic session as well.

In operation, the photo editor may access the digital images in the server 130 through a client application in the tablet device 200. The photo editor may perform various photo editing operations on the digital images through the client application. Examples of the type of photo editing operations that may be performed include, but need not be limited to, selection, cropping, image size changes, color and/or contrast adjustments, noise reductions, orientation changes, and/or image enhancement. In this regard, the tablet device 200 may comprise suitable logic, circuitry, code, and/or interfaces that may be operable to enable communication with the server 130 through the network 120 and to enable the display of a GUI that is utilized with the client application to allow the photo editor to perform the photo editing operations remotely.

Once a particular digital image has been edited, the photo editor may approve the digital image for distribution to one or more outlets. While an approval process may be available as part of the operations performed by the photo editor through the client application in the tablet device 200, such as process need not be a required process. For example, an approval process may be made available for certain photographic sessions. In this regard, the server 130 may be operable to manage the approval of digital images.

The photo editor may also tag or identify certain digital images during the photo editing process. For example, a photo editor may identify some digital images as being of higher interest for distribution than other digital images. In this regard, the client application may be utilized to tag a digital image and the tagging information is provided to the server 130 where it is stored with the corresponding digital image.

The photo editor may select the particular photographic session that he/she is interested in editing and may then access the digital images that correspond to that photographic session. The client application in the tablet device 200 may be operable to interact with data in the server 130 that corresponds to one or more photographic sessions. In this regard, the server 130 may be utilized to control access to the data from multiple photographic sessions. For example, the server 130 may only authorize access to a particular photographic session or to a particular set of photographic sessions.

In some embodiments of the invention, multiple photo editors may collaborate in the photo editing operations. For example, when an approval process is available and is part of the overall workflow, more than one photo editor may collaborate to approve the digital images.

The social media producer may access the digital images in the server 130 through a client application in the tablet device 202. The social media producer may select certain digital images for distribution to one or more of the social media outlets 220 and/or to one or more of the websites 230. For example, the social media producer may select a digital image and may instruct the server 130 through the client application in the tablet device 202 that the selected digital image is to be distributed to one or more of the social media outlets 220 by using Twitter or by posting the digital image to Facebook. In another example, the social media producer may select a digital image and may instruct the server 130 through the client application in the tablet device 202 that the selected digital image is to be distributed to one or more of the websites 230 where a third-party may access the digital images for reporting on the event or gathering. The third-parties described herein may be, for example, clients that have authorized access to the website to obtain or download digital images that correspond to a particular photographic session.

While the tablet devices 200 and 202 have been described herein with respect to the operations handled by the photo editor and the social media producer in connection with the data stored in the server 130, the invention need not be so limited. Other types of devices, such as computers, laptops, personal digital assistants, smartphones, and the like, which may support the use of client applications for carrying out the operations handled by the photo editor and the social media producer, may also be utilized.

Figure 3:
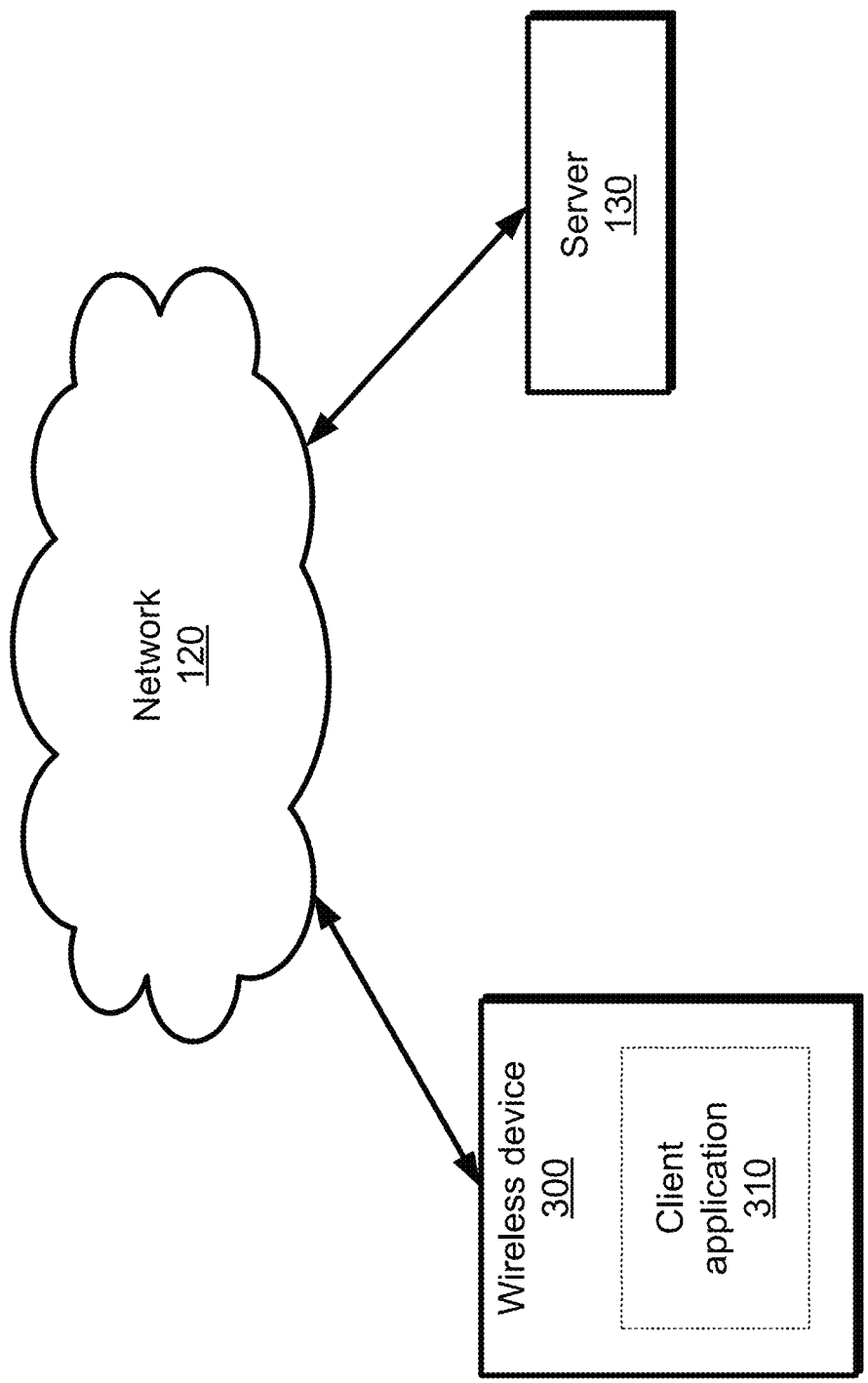
FIG. 3 is a diagram that illustrates an exemplary client application in a wireless device for image and metadata management operations in a photographic session, in accordance with an embodiment of the invention.

FIG. 3 is a diagram that illustrates an exemplary client application in a wireless device for image and metadata management operations in a photographic session, in accordance with an embodiment of the invention. Referring to FIG. 3, there is shown a wireless device 300 that may be operable to communicate with the server 130 through the network 120. The wireless device 300 may correspond to the camera 100, the camera 102, the mobile phone 110, the mobile phone 112, the tablet device 200, and the tablet device 202. That is, the wireless device 300 may be utilized to interact with the server 130 to perform image and metadata management operations corresponding to a photographic session.

The wireless device 300 may be operable to run or execute a client application 310. The client application 310 may correspond to the client applications described above with respect to FIGS. 1 and 2. The client application 310 may be utilized to request services and/or operations provided by the server 130, which in turn is the source of those services and/or operations. In this regard, the server 130 may operate as a host that runs or executes one or more server programs that share their resources with the client application 310. While a single client application 310 is shown in FIG. 3, the server 130 may provide a function or service to multiple client applications concurrently. Communication between the client application 310 and the server 300 may be through a protocol such HTTP, for example.

Figure 4:
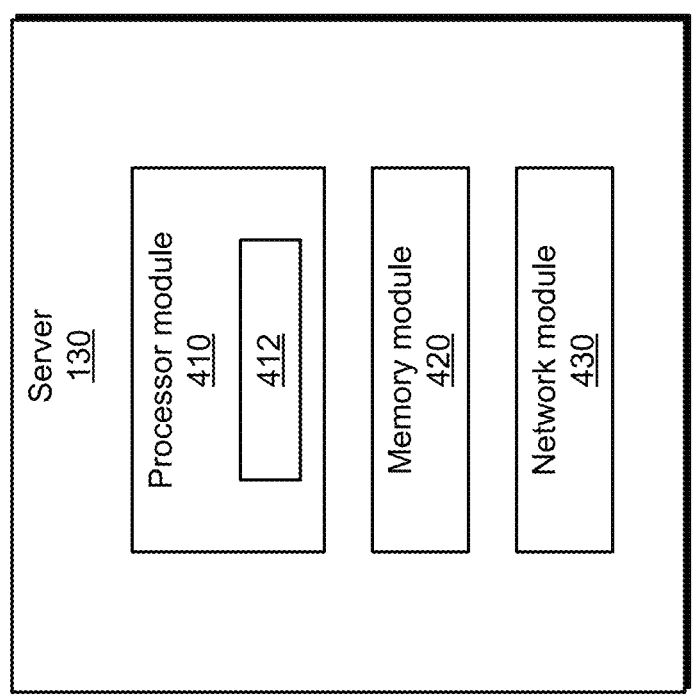
FIG. 4 is a block diagram that illustrates an exemplary architecture of a server utilized for image and metadata management operations in a photographic session, in accordance with an embodiment of the invention.

FIG. 4 is a block diagram that illustrates an exemplary architecture of a server utilized for image and metadata management operations in a photographic session, in accordance with an embodiment of the invention. Referring to FIG. 4, there is shown the server 130 comprising a processor module 410, a memory module 420, and a network module 430.

The processor module 410 may comprise suitable logic, circuitry, code, and/or interfaces that may be operable to perform the operations, functions, processes, computations, and the like described herein with respect to the server 130. In this regard, the processor module 410 may be operable to handle image and metadata management operations for one or more photographic sessions.

The processor module 410 may be operable to receive and store digital images, to attach metadata to the digital images, to enable approval and/or selection of the digital images, to provide photo editing capabilities, and/or to enable the transmission of the digital images to certain destinations for distribution.

The processor module 410 may comprise at least one processing device 412. The processing device 412 may be a central processing unit (CPU), a digital signal processor (DSP), and/or other type of integrated circuit that may be utilized to perform data processing operations.

The memory module 420 may comprise suitable logic, circuitry, code, and/or interfaces that may be operable to store information utilized to enable image and metadata management operations. For example, the memory module 420 may be operable to store digital images and metadata corresponding to those digital images. In this regard, the memory module 420 may be operable to organize the digital images according to photographic sessions, for example.

The network module 430 may comprise suitable logic, circuitry, code, and/or interfaces that may be operable to allow the server 130 to communicate with the cameras 100 and 102, the mobile phones 110 and 112, and/or the tablet devices 200 and 202. Moreover, the network 430 may be operable to communicate with the social media outlets 220 and/or the websites 230 described above with respect to FIG. 2.

In operation, the server 130 may receive digital images through the network module 430 from one or more photographers in a photographic session. The digital images may be identified with the photographic session by the processor module 410, which in turn may have metadata corresponding to that photographic session attached to the digital images. In this regard, the metadata may be stored in the memory module 420 when the metadata is session metadata, that is, when the metadata is created as part of setting up the photographic session. The processor module 410 may run or execute programs that may provide resources to client applications to enable photo editing and/or social media production operations. When a digital image is to be distributed to a social media outlet and/or to a website, the digital image may be communicated to the appropriate destination by the network module 430.

Figure 5:
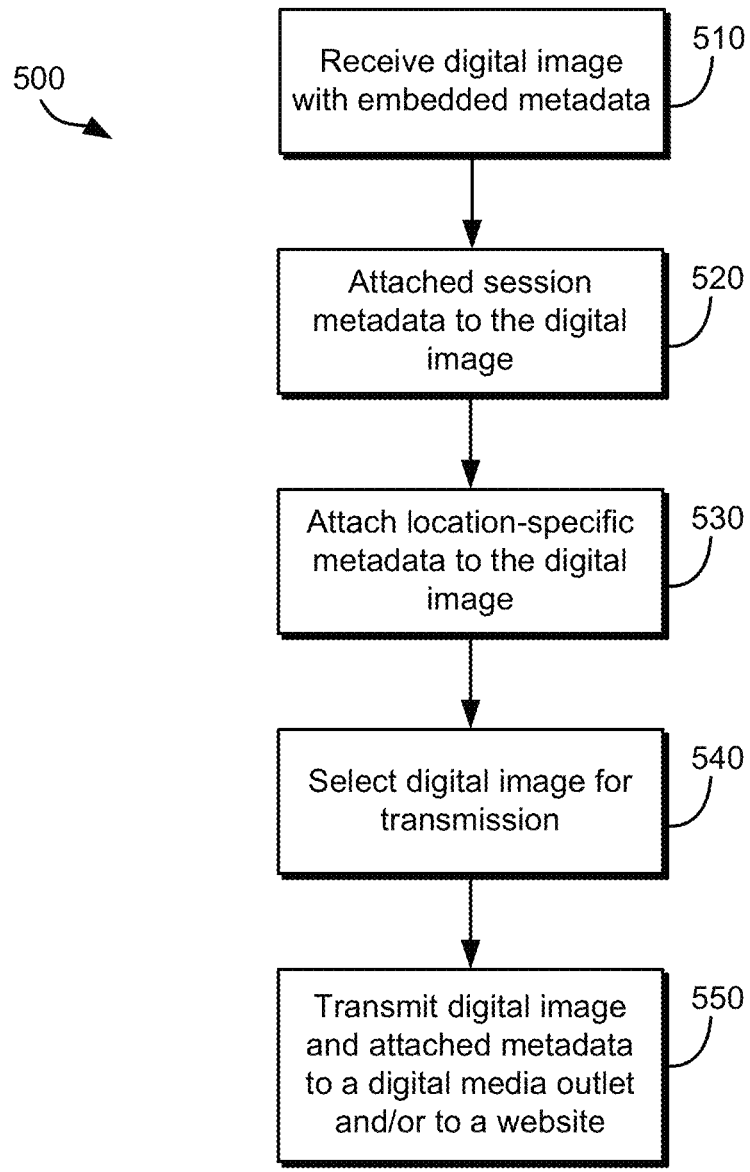
FIGS. 5 and 6 are each a flow diagram that illustrates exemplary steps for image and metadata management operations in a photographic session, in accordance with embodiments of the invention.
Figure 6:
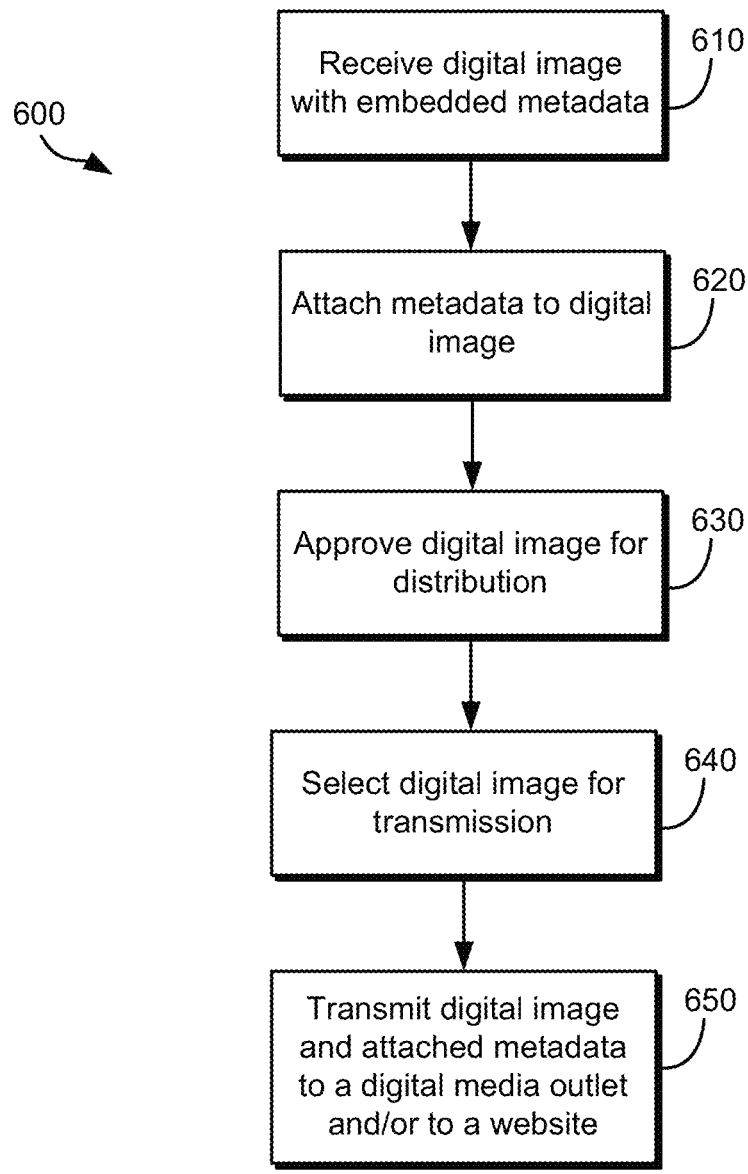

FIGS. 5 and 6 are each a flow diagram that illustrates exemplary steps for image and metadata management operations in a photographic session, in accordance with embodiments of the invention. Referring to FIG. 5, there is shown a flow chart 500 in which, at step 510, the server 130 may receive a digital image with embedded metadata. The embedded metadata may comprise metadata introduced by the camera during the image capture and image processing operations of the camera. At step 520, session metadata stored in the server 130 may be attached to the digital image. At step 530, a photographer utilizing a client application in a wireless device, for example, may provide location-specific metadata that may be attached by the server 130 to the digital image. At step 540, a photo editor and/or a social media producer utilizing a client application in a wireless device, for example, may provide instructions to select a digital image for transmission to a particular destination. At step 550, the server 130 may transmit the selected digital image, and its metadata, to a digital media outlet (e.g., digital media outlets 220) and/or to a website (e.g., websites 230).

Referring to FIG. 6, there is shown a flow chart 600 in which at step 610, the server 130 may receive a digital image with embedded metadata. The embedded metadata may comprise metadata introduced by the camera during the image capture and image processing operations of the camera. At step 620, metadata may be attached to the digital image by the server 130. The metadata may be session metadata stored in the server 130 and/or location-specific metadata provided by a photographer or other like person through a client application in a wireless device. At step 630, a photo editor or a group of photo editors collaborating utilizing client applications in wireless devices, for example, may approve a digital image for distribution. At step 640, a social media producer utilizing a client application in a wireless device, for example, may provide instructions to select the approved digital image for transmission to a particular destination. At step 650, the server 130 may transmit the approved and selected digital image, and its metadata, to a digital media outlet (e.g., digital media outlets 220) and/or to a website (e.g., websites 230).

Figure 7:
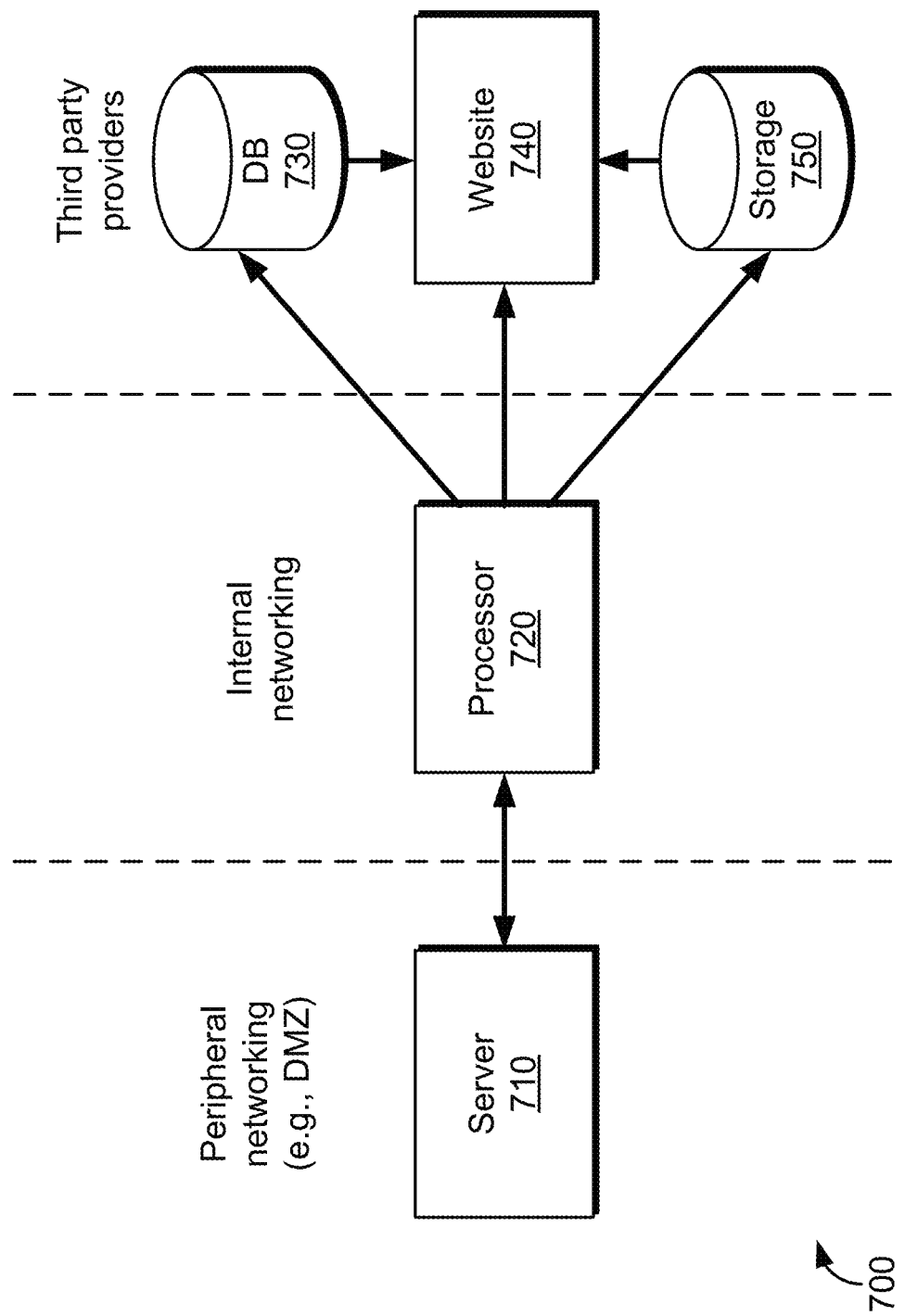
FIG. 7 is a block diagram that illustrates an exemplary architecture for distribution of images from a photographic session to a website, in accordance with an embodiment of the invention.

FIG. 7 is a block diagram that illustrates an exemplary architecture for distribution of images from a photographic session to a website, in accordance with an embodiment of the invention. Referring to FIG. 7, there is shown an architecture 700 comprising a server 710, a processor 720, a database (DB) 730, a website 740, and a storage 750. The server 710 may comprise at least some of the functionality of the server 130 described above. In this regard, the server 710 may handle the interaction with one or more wireless devices and/or with one or more persons in a photographic session. The server 710 may comprise suitable logic, circuitry, code, and/or interfaces that may be operable to provide peripheral networking, sometimes referred to as a demilitarized zone (DMZ), which enables some degree of separation between the processor 720 and a larger external network such as the Internet, for example.

The processor 720 may comprise suitable logic, circuitry, code, and/or interfaces that may be operable to access, manipulate, edit, and/or otherwise process images and/or metadata corresponding to a photographic session. The processor 720 may comprise at least some of the functionality of the server 130 described above. The processor 720 may be part of an internal or local area network that may be operable to communicate with external or third parties such as the DB 730, the website 740, and/or the storage 750.

The DB 730 and the storage 750 may comprise suitable logic, circuitry, code, and/or interfaces that may be operable to provide cloud-based storage services in which to storage and/or access information generated from one or more photographic sessions, including but not limited to images or photographs and/or metadata. The website 740 may be operable to post and/or access information from the processor 720, the DB 730, and/or the storage 750.

In operation, the architecture 700 may perform image and metadata management operations for one or more photographic sessions. For example, photographic session information may be received by the processor 720 through the server 710. The processor 720 may handle the information and may distribute the information to different outlets or websites. The processor 720 may communicate some or all of the photographic session received to one or more of the DB 730, the website 740, and the storage 750. In some instances, information or data stored in the DB 730 and/or in the storage 750 may be communicated to the website 740.

Figure 8A:
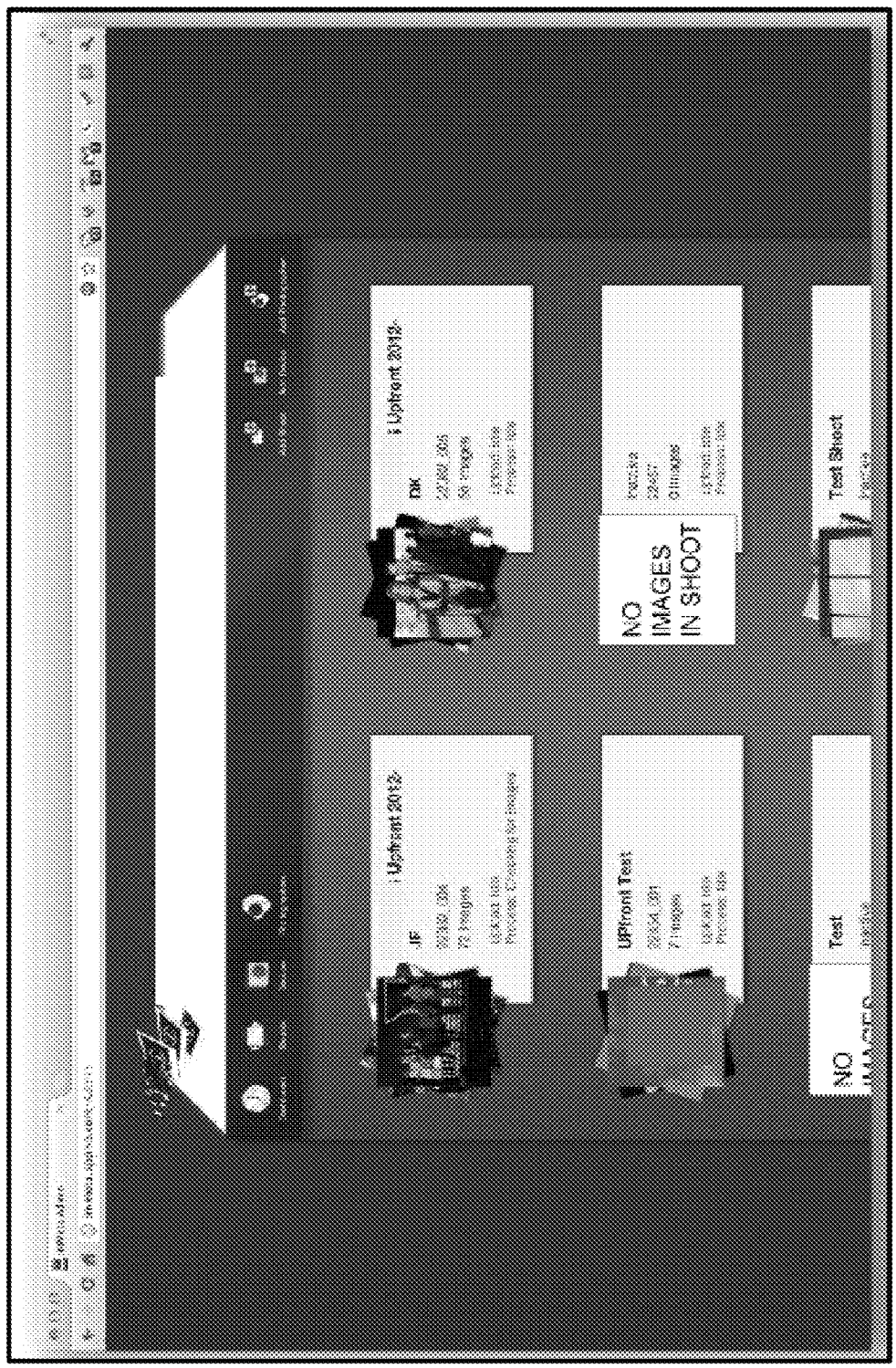
FIGS. 8A-8D are each an example of an administrative screen shot for image and metadata management operations in a photographic session, in accordance with embodiments of the invention.

FIGS. 8A-8D are each an example of an administrative screen shot that may be utilized for image and metadata management operations in a photographic session, in accordance with embodiments of the invention. Referring to FIG. 8A, there is shown a screen shot of a user interface that may be utilized to manage, access, edit, and/or otherwise process content (e.g., images, metadata) corresponding to a photographic session or photographic shoot. For example, in FIG. 8A there are shown at least two sets of photographs taken during a same session titled "Upfront 2012." One set has 72 images corresponding to a first photographer (e.g., photographer JF) and another set has 56 images corresponding to a second photographer (e.g., photographer DK). For each set, one of the images may be provided as an icon to enable identification of the contents in that set.

Figure 8B:
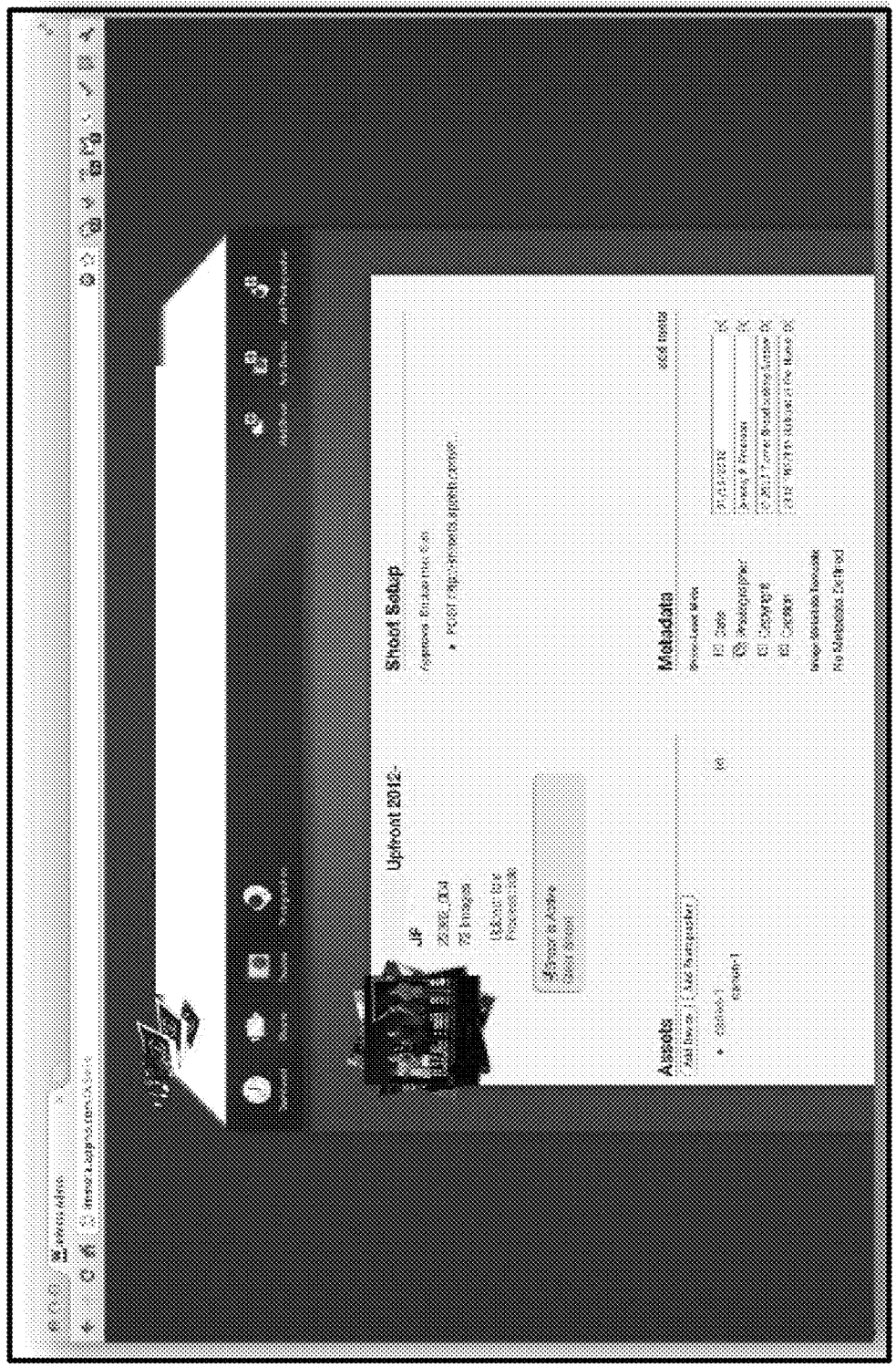

Referring to FIG. 8B, there is shown a screen shot of a user interface that may be utilized to manage, access, edit, and/or otherwise process content (e.g., images, metadata) corresponding to a particular photographer in a photographic session. For example, in the upper-left corner the photographic session information may be displayed, including the status of upload and process operations. In this example, the upload and process operations are listed as being "idle." In the upper-right corner there is shown setup information corresponding to the particular session or shoot. In the lower-left corner there is shown assets information such as the type of camera or device being used in the session. Moreover, in the lower-right corner there is shown a metadata section where different information may be provided for shoot-level metadata and photograph-level metadata. For example, shoot-level metadata may comprise date, photographer, copyright, and/or caption information.

Figure 8C:
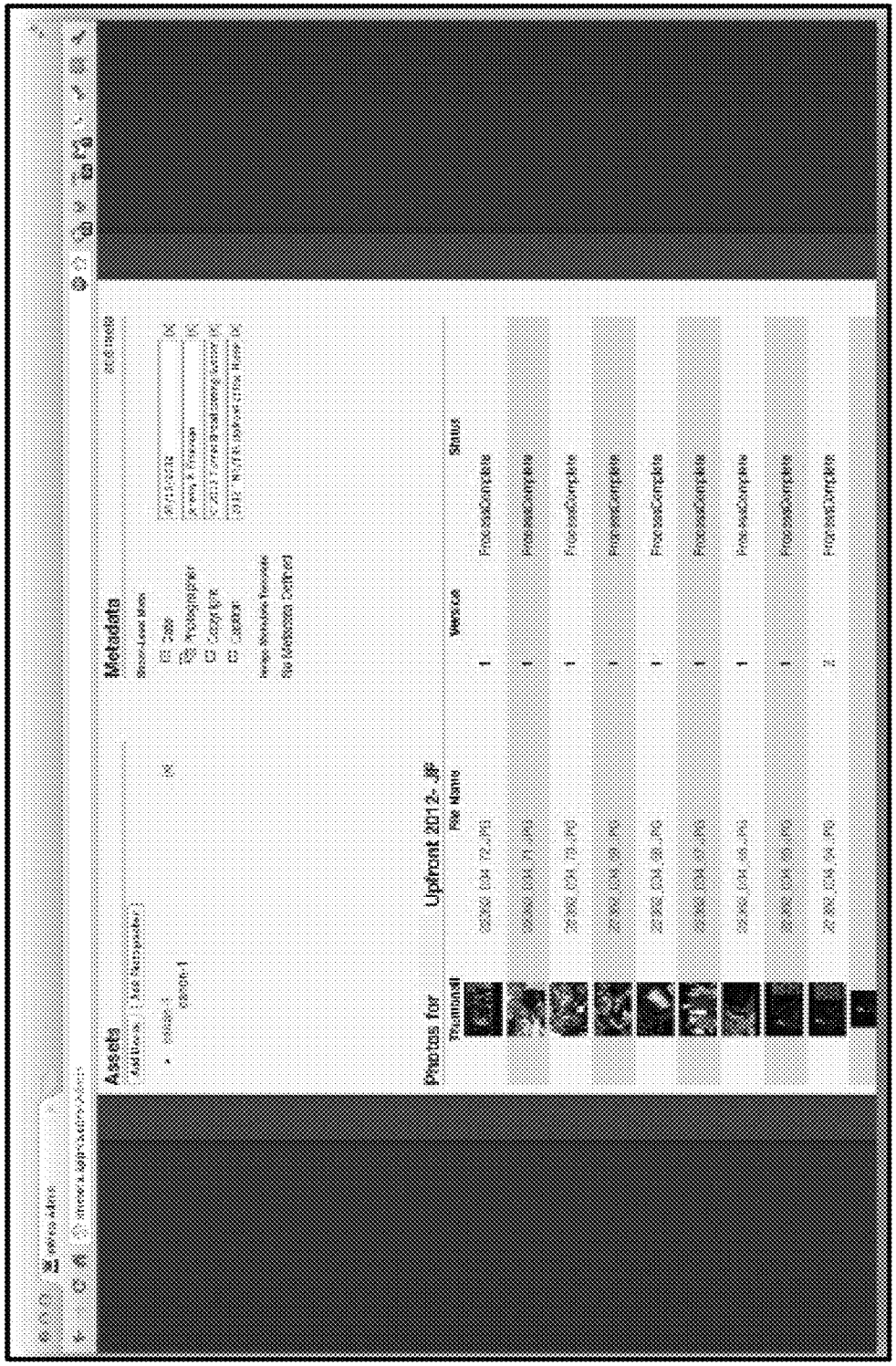

Referring to FIG. 8C, there is shown a screen shot of a lower portion of the user interface shown in FIG. 8B. In this portion of the user interface, the various images corresponding to the photographer are listed. Each of the listed images may be represented by a thumbnail, a filename, a version number, and/or a status of the image.

Figure 8D:

Referring to FIG. 8D, there is shown a screen shot of a user interface in which the active sessions or shoots are listed in the left portion of the screen and the active photographers and devices are listed on the right portion of the screen. Navigating and/or selecting between the different information described in FIGS. 8A-8D may be performed by utilizing the icons or buttons displayed on the top portion of the user interface.

Figure 9A:
FIGS. 9A-9H are each an example of a screen shot in a smartphone device for image and metadata management operations in a photographic session, in accordance with embodiments of the invention.
Figure 9B:

FIGS. 9A-9H are each an example of a screen shot on a smartphone device or other like communication device for image and metadata management operations in a photographic session, in accordance with embodiments of the invention. Referring to FIG. 9A, there is shown a screen shot of a user interface displayed on a smartphone device such as the mobile phone 110 or the wireless device 300, for example. In this example, a contact sheet is displayed having multiple images corresponding to the session titled "Upfront 2012" and taken by photographer DK. Each of the images may be represented by at least a thumbnail and a filename, for example. Referring to FIG. 9B, there is shown a screen shot of the user interface of FIG. 9A with the contact sheet having actions at the bottom opened for user interaction.

Figure 9C:
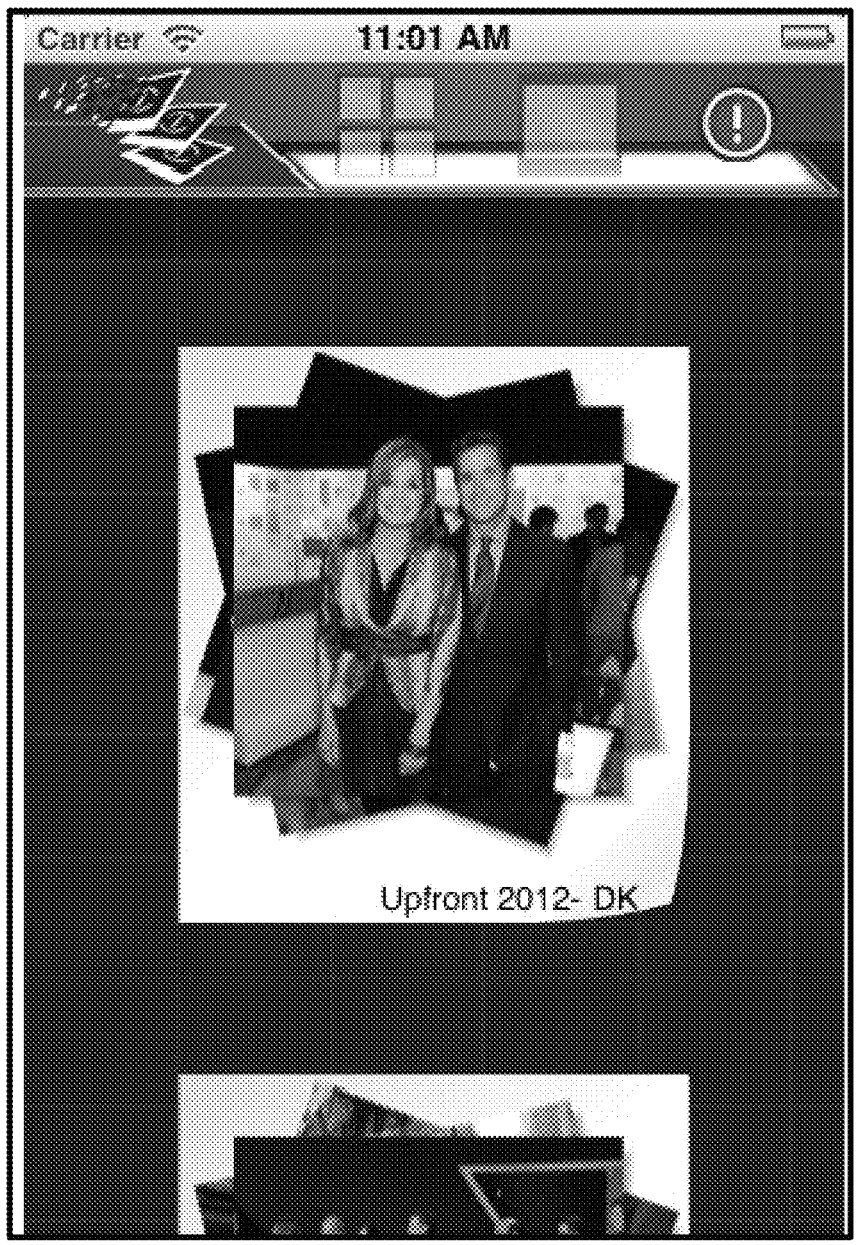
Figure 9D:
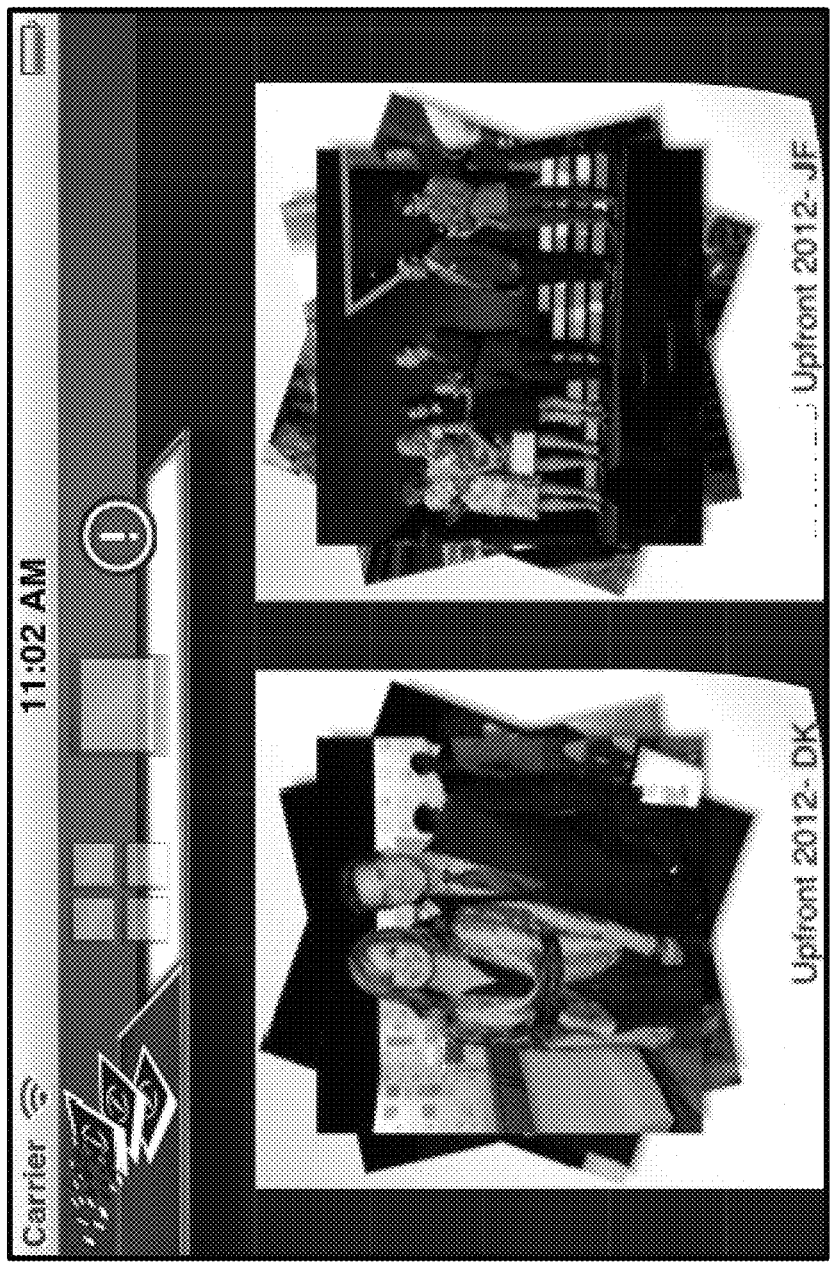

Referring to FIG. 9C, there is shown a screen shot of a user interface displayed on a smartphone device that corresponds to a home screen. The home screen is shown in portrait view and may include an icon corresponding to a particular photographic session and/or a particular photographer in that session. For example, in FIG. 9C there is shown an icon or thumbnail for the session titled "Upfront 2012" and photographer DK. Referring to FIG. 9D, there is shown the home screen of FIG. 9C in landscape view. In this view, an icon or thumbnail for the session titled "Upfront 2012" and photographer DK is displayed as well as an icon or thumbnail for the session titled "Upfront 2012" and photographer JF.

Figure 9E:

Referring to FIG. 9E, there is shown a screen shot of a user interface displayed on a smartphone device that corresponds to a metadata screen. The metadata screen may enable accessing, modifying, and/or editing metadata information such as image or picture caption, copyright, date, and/or photographer, for example.

Figure 9F:
Figure 9G:
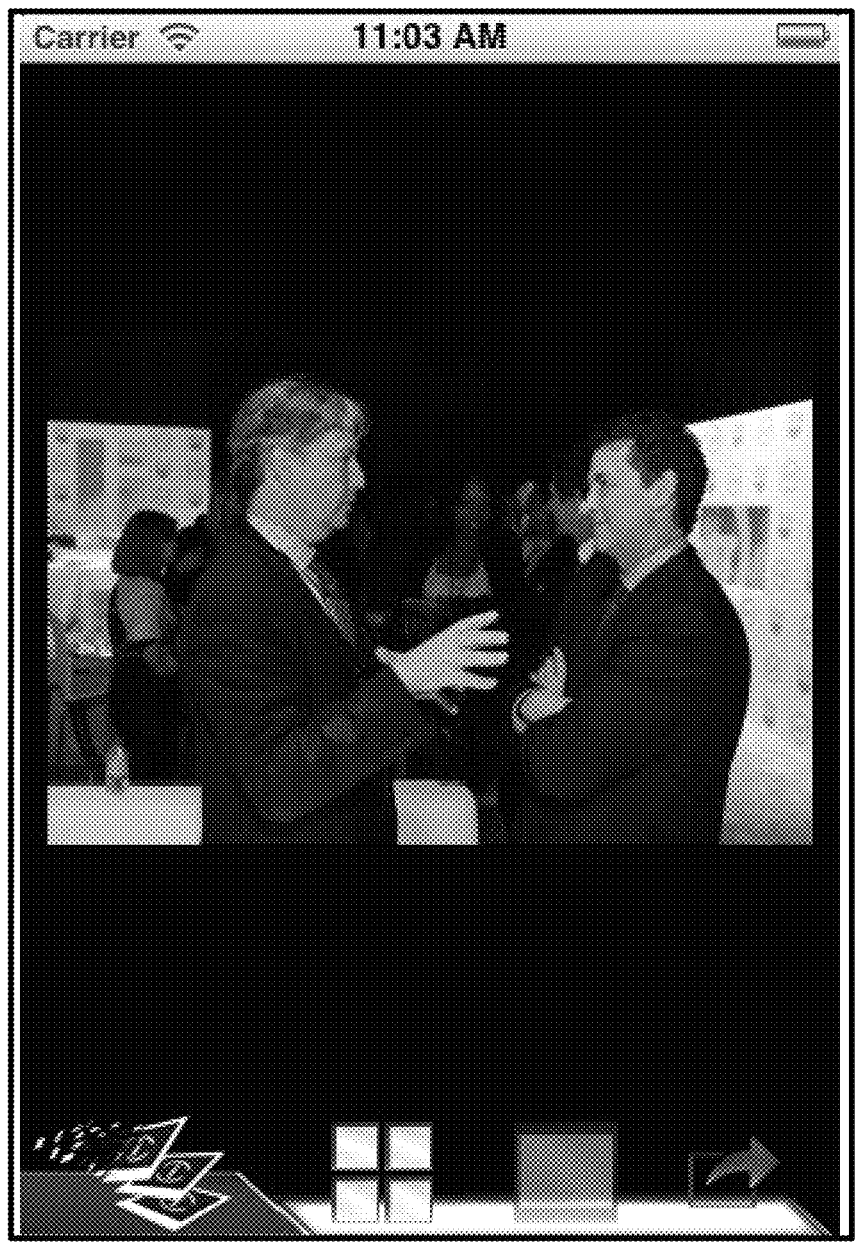

Referring to FIGS. 9F and 9G, there are shown screen shots of a user interface displayed on a smartphone device that correspond to an image viewer in landscape view and in portrait view respectively.

Figure 9H:
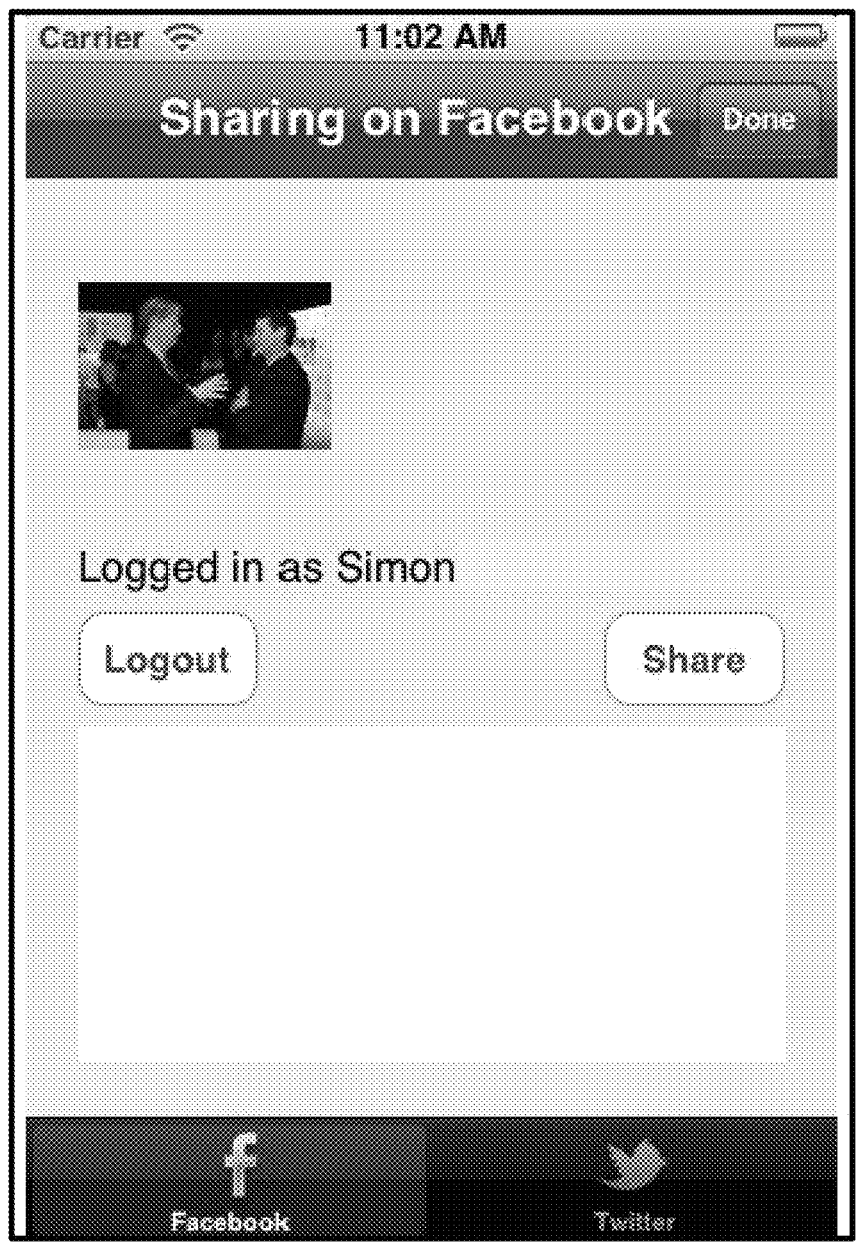

Referring to FIG. 9H, there is shown a screen shot of a user interface displayed on a smartphone device that corresponds to a sharing screen. The sharing screen may be utilized to communicate an image and its metadata to a social media outlet. For example, in FIG. 9H a user that has logged in may communicate or share the image being displayed to Facebook or Twitter. The invention need not be so limited and the image may also be shared to other and/or different social media outlets and/or websites.

Figure 10A:
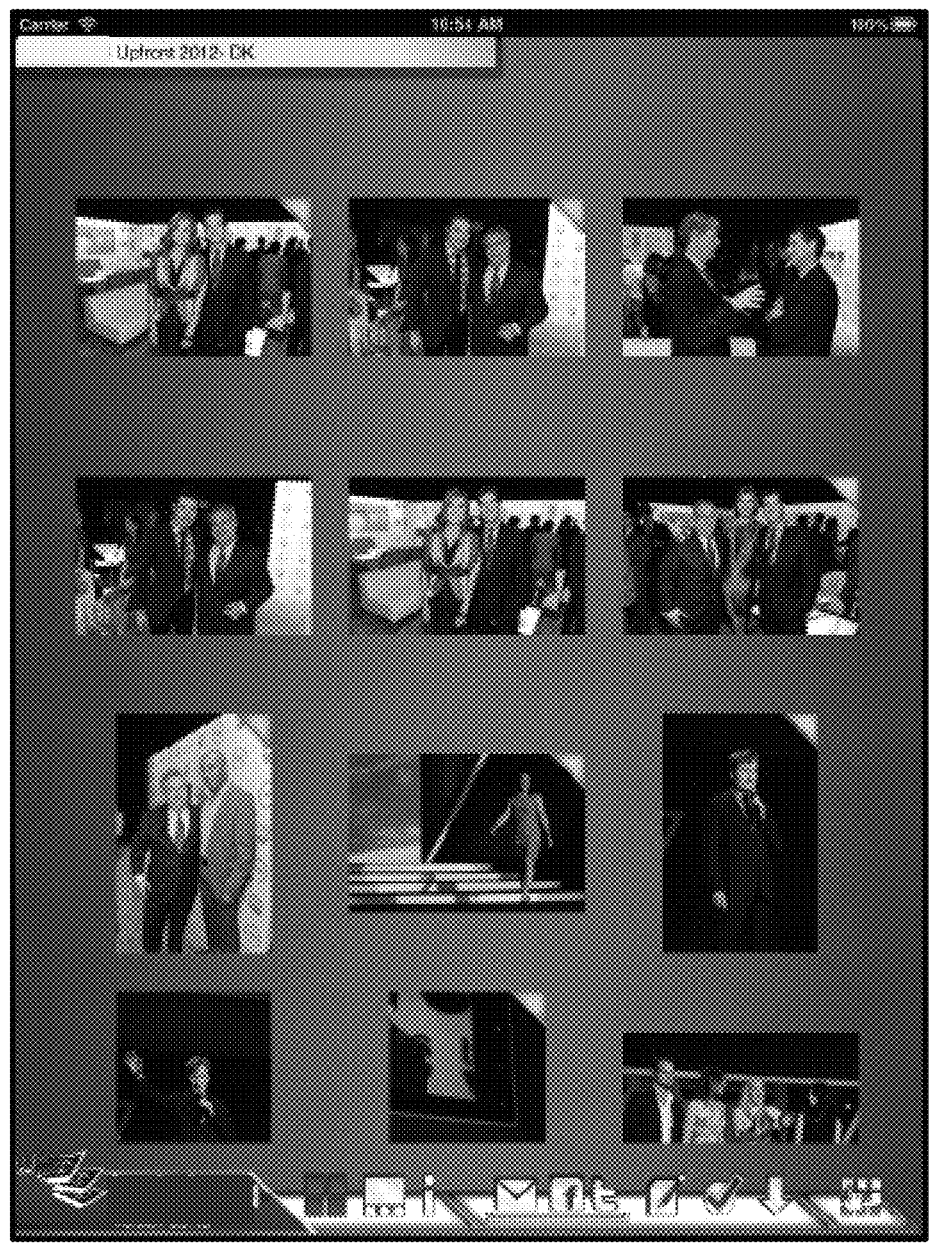
FIGS. 10A-10G are each an administrative screen shot in a tablet device for image and metadata management operations in a photographic session, in accordance with embodiments of the invention.
Figure 10B:
Figure 10C:

FIGS. 10A-10G are each an administrative screen shot on a tablet or other like communication device for image and metadata management operations in a photographic session, in accordance with embodiments of the invention. Referring to FIG. 10A, there is shown a screen shot of a user interface displayed on a tablet device such as the tablet devices 200 and 202 or the wireless device 300, for example. In this example, a contact sheet is displayed having multiple images corresponding to the session titled "Upfront 2012" and taken by photographer DK. Each of the images may be represented by at least a thumbnail and a filename, for example. Referring to FIG. 10B, there is shown a screen shot of a user interface having the images shown in FIG. 10A arranged in a batch mode. Referring to FIG. 10C, there is shown a screen shot of the user interface shown in FIG. 10A in landscape view.

Figure 10D:

Referring to FIG. 10D, there is shown a screen shot of a user interface displayed on a tablet device that corresponds to a metadata screen. The metadata screen may enable accessing, modifying, and/or editing metadata information such as image or picture caption, copyright, date, and/or photographer, for example.

Figure 10E:

Referring to FIG. 10E, there is shown a screen shot of a user interface displayed on a tablet device that corresponds to a sharing screen. The sharing screen may be utilized to communicate an image and its metadata to a social media outlet. For example, in FIG. 10E a user that has logged in may utilize a virtual keyboard to communicate or share the image being displayed to Facebook or Twitter. The invention need not be so limited and the image may also be shared to other and/or different social media outlets and/or websites.

Figure 10F:

Referring to FIG. 10F, there is shown a screen shot of a user interface displayed on a tablet device that corresponds to a filmstrip screen. The filmstrip screen may display one or more images in the bottom portion of the screen and may display a larger view of one of those images in the top portion of the screen.

Figure 10G:
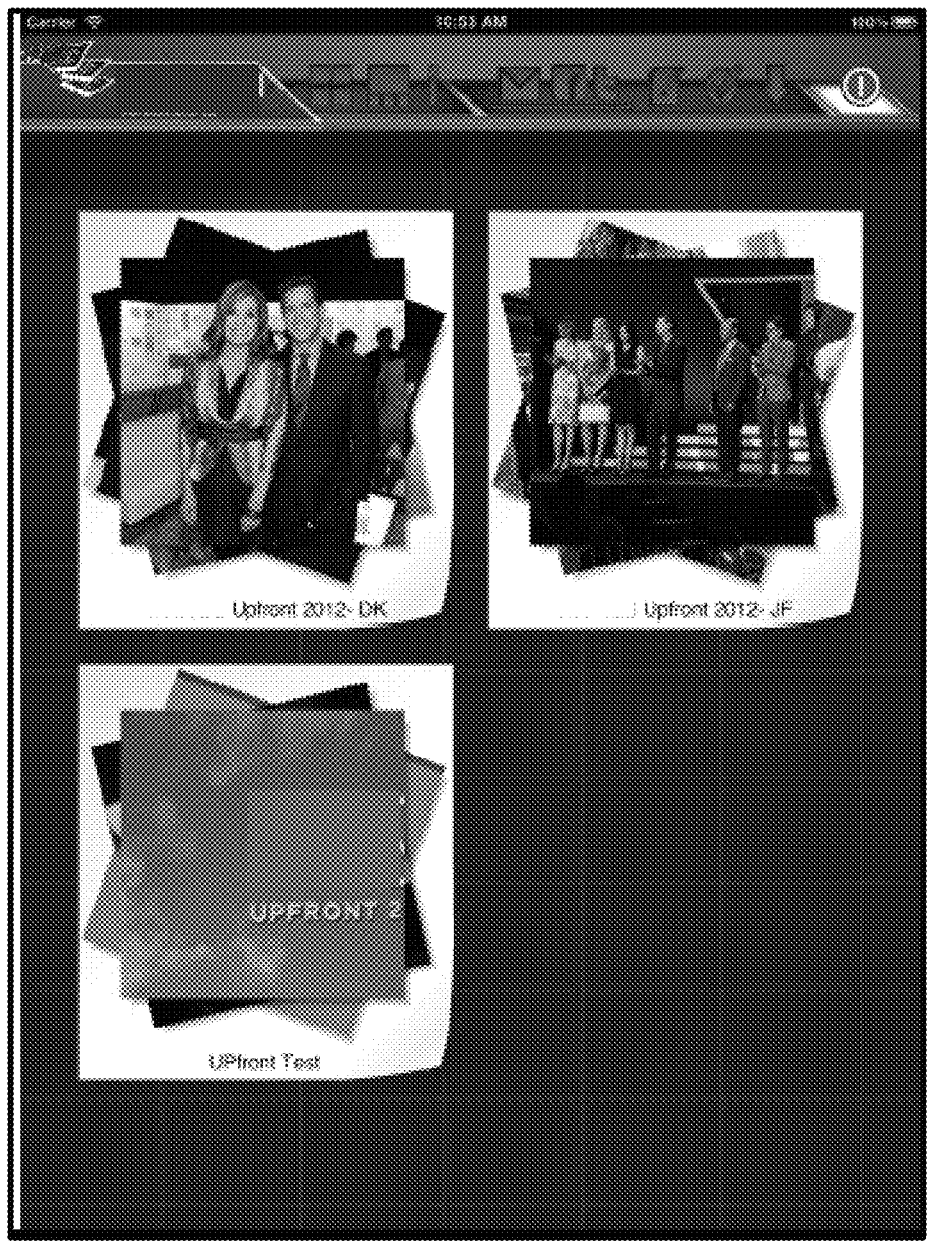

Referring to FIG. 10G, there is shown a screen shot of a user interface displayed on a tablet device that corresponds to a home screen. The home screen may include one or more icons, each corresponding to a particular photographic session and/or a particular photographer in that session. For example, in FIG. 10G there is shown an icon or thumbnail for the session titled "Upfront 2012" and photographer DK. There is also shown an icon or thumbnail for the session titled "Upfront 2012" and photographer JF. Moreover, there is shown an icon or thumbnail for the session titled "UPfront Test."

Figure 11A:
FIGS. 11A and 11B are each a screen shot as seen by a consumer of images from a photographic session, in accordance with embodiments of the invention.
Figure 11B:
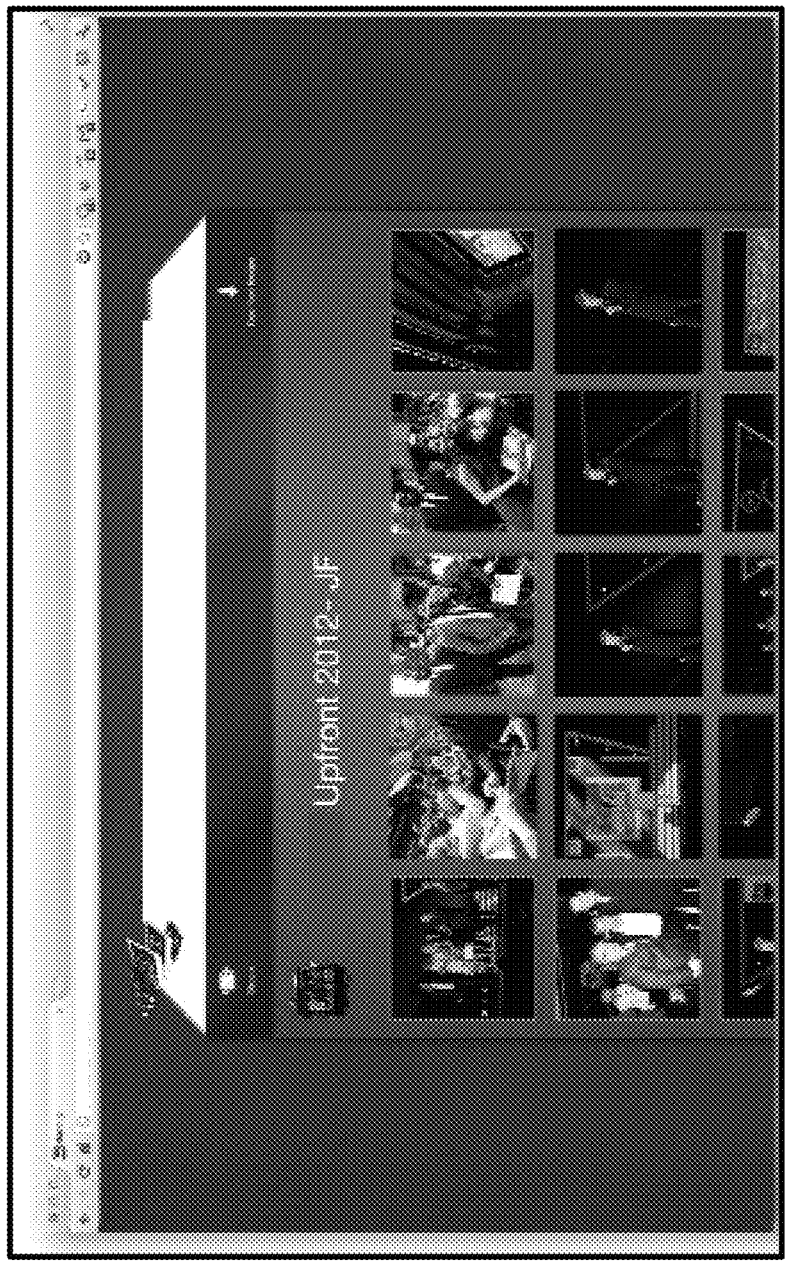

FIGS. 11A and 11B are each a screen shot as seen by a consumer of images from a photographic session, in accordance with embodiments of the invention. Referring to FIG. 11A, there is shown a screen shot of a user interface displayed on a consumer device (e.g., computer, mobile device, tablet) that corresponds to a home screen. The home screen may include one or more icons, each corresponding to a particular photographic session and/or a particular photographer in that session, which enable a consumer to access the content corresponding to those icons. For example, in FIG. 11A there are shown three different icons that correspond to different photographic sessions and/or different photographers. Referring to FIG. 11B, there is shown a screen shot of a user interface displayed on a consumer device that corresponds to a contact sheet. The contact sheet may have multiple images corresponding to the session titled "Upfront 2012" and taken by photographer DK that a consumer can access for copying, downloading, and/or distribution, for example.

In another embodiment of the invention, the server 130 may be operable to communicate with the cameras 100 and 102 corresponding to the single photographic session illustrated in FIG. 1. The server 130 may be operable receive a digital image from one of the cameras, to attach to the digital image corresponding metadata, and to transmit the digital image and the attached corresponding metadata to one of the social media outlets 220 and/or to one of the websites 230 illustrated in FIG. 2. A portion of the metadata corresponding to the digital image may be received from an application in a wireless device such as the wireless device 300, wherein the server 130 is operable to communicate with the wireless device 300. The portion of the metadata corresponding to the digital image received from the application in the wireless device 300 may comprise location information (e.g., GPS position) of the wireless device.

In another aspect of this embodiment of the invention, the metadata corresponding to the digital image may comprise one or more of copyright information, scene description, photographer name, photographic session name, date of photographic session, and photographic session location.

In another aspect of this embodiment of the invention, the server 130 may be operable to select the digital image from among a plurality of digital images stored in the server 130. Moreover, the server 130 may be operable to transmit the selected digital image to one of the social media outlets 220 and/or to one of the websites 230, wherein the corresponding metadata attached to the selected digital image is transmitted along with the selected digital image.

In another aspect of this embodiment of the invention, the server 130 may be operable to approve the digital image for distribution, to select the approved digital image from among a plurality of digital images stored in the server 130, and to transmit the selected digital image to one of the social media outlets 220 and/or to one of the websites 230, wherein the corresponding metadata attached to the selected digital image is transmitted along with the selected digital image.

In another aspect of this embodiment of the invention, the server 130 may be operable to receive an additional digital image from one of the cameras 100 and 102 and to attach to the additional digital image corresponding metadata. Moreover, the server 130 may be operable to select for transmission to one of the social media outlets 220 and/or one of the websites 230 the digital image and its attached corresponding metadata or the additional digital image and its attached corresponding metadata.

In another aspect of this embodiment of the invention, the server 130 may be operable to receive a first portion of the metadata corresponding to the digital image from an application in a first wireless device. The first wireless device may be one of the mobile phones 110 and 112 described in FIG. 1 or one of the tablet devices 200 and 202 described in FIG. 2, for example. The server 130 may be operable to receive a second portion of the metadata corresponding to the digital image from an application in a second wireless device, wherein the server 130 is operable to communicate with the first wireless device and with the second wireless device. The second wireless device may be a different device from the first wireless device and may be one of the mobile phones 110 and 112 described in FIG. 1 or one of the tablet devices 200 and 202 described in FIG. 2, for example.

In another aspect of this embodiment of the invention, the server 130 may be operable to generate information for a graphical user interface (GUI) corresponding to an application in the wireless device 300. The server 130 may be operable to transmit the information to the wireless device 300 for display of the GUI in the wireless device 300, wherein the server 130 is operable to communicate with the wireless device 300. In addition, the server 130 may be operable to receive from the wireless device 300 at least a portion of the metadata corresponding to the digital image, digital image approval information, and/or digital image selection information, each of which is provided by a user of the wireless device 300 in response to the GUI displayed.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for image and metadata management.

Accordingly, the present invention may be realized in hardware, software, or a combination of hardware and software. The present invention may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a server operable to communicate with a plurality of cameras corresponding to a single photographic session, and to store a plurality of digital images received from the plurality of cameras:
receiving a digital image from one of the plurality of cameras;
attaching to the digital image, corresponding metadata;
storing the digital image and the attached corresponding metadata;
transmitting the digital image and the attached corresponding metadata to one or both of a social media outlet and a website;
transmitting information for a graphical user interface (GUI) corresponding to an application in a wireless device to the wireless device for display on the GUI corresponding to the application in the wireless device, wherein the server is operable to communicate with the wireless device; and
receiving from the wireless device one or more of at least a portion of the metadata corresponding to the digital image, digital image approval information, and digital image selection information, each of which is provided by a user of the wireless device in response to the GUI displayed.

2. The method of claim 1, comprising receiving a portion of the metadata corresponding to the digital image from the application in the wireless device.

3. The method of claim 2, wherein the portion of the metadata corresponding to the digital image received from the application in the wireless device comprises location information of the wireless device.

4. The method of claim 1, wherein the metadata corresponding to the digital image comprises one or more of:
copyright information,
scene description,
photographer name,
photographic session name,
date of photographic session, and
photographic session location.

5. The method of claim 1, comprising:
selecting the digital image from among the plurality of digital images stored in the server; and
transmitting the selected digital image to one or both of the social media outlet and the website, wherein the corresponding metadata attached to the selected digital image is transmitted along with the selected digital image.

6. The method of claim 1, comprising:
approving the digital image for distribution;
selecting the approved digital image from among the plurality of digital images stored in the server; and
transmitting the selected digital image to one or both of the social media outlet and the website, wherein the corresponding metadata attached to the selected digital image is transmitted along with the selected digital image.

7. The method of claim 1, comprising:
receiving an additional digital image from one of the plurality of cameras;
attaching to the additional digital image corresponding metadata; and
selecting for transmission to one or both of the social media outlet and the website one of:
the digital image and its attached corresponding metadata, and
the additional digital image and its attached corresponding metadata.

8. The method of claim 1, comprising:
receiving a first portion of the metadata corresponding to the digital image from a first application in a first wireless device; and
receiving a second portion of the metadata corresponding to the digital image from a second application in a second wireless device, wherein the server is operable to communicate with the first wireless device and with the second wireless device.

9. The method of claim 1, comprising
generating the information for the graphical user interface (GUI) corresponding to the application in the wireless device.

10. A system, comprising a server operable to:
communicate with a plurality of cameras corresponding to a single photographic session;
to store a plurality of digital images received from the plurality of cameras;
receive a digital image from one of the plurality of cameras;
attach to the digital image, corresponding metadata; and
storing the digital image and the attached corresponding metadata;
transmit the digital image and the attached corresponding metadata to one or both of a social media outlet and a website;
transmit information for a graphical user interface (GUI) corresponding to an application in a wireless device to the wireless device for display on the GUI corresponding to the application in the wireless device, wherein the server is operable to communicate with the wireless device; and
receive from the wireless device one or more of at least a portion of the metadata corresponding to the digital image, digital image approval information, and digital image selection information, each of which is provided by a user of the wireless device in response to the GUI displayed.

11. The system of claim 10, wherein the server is operable to
receive a portion of the metadata corresponding to the digital image from the application in the wireless device.

12. The system of claim 11, wherein the portion of the metadata corresponding to the digital image received from the application in the wireless device comprises location information of the wireless device.

13. The system of claim 10, wherein the metadata corresponding to the digital image comprises one or more of:
copyright information,
scene description,
photographer name,
photographic session name,
date of photographic session, and
photographic session location.

14. The system of claim 10, wherein the server is operable to:
select the digital image from among the plurality of digital images stored in the server; and
transmit the selected digital image to one or both of the social media outlet and the website, wherein the corresponding metadata attached to the selected digital image is transmitted along with the selected digital image.

15. The system of claim 10, wherein the server is operable to:
approve the digital image for distribution;
select the approved digital image from among the plurality of digital images stored in the server; and
transmit the selected digital image to one or both of the social media outlet and the website, wherein the corresponding metadata attached to the selected digital image is transmitted along with the selected digital image.

16. The system of claim 10, wherein the server is operable to:
receive an additional digital image from one of the plurality of cameras;
attach to the additional digital image corresponding metadata; and
select for transmission to one or both of the social media outlet and the website one of:
the digital image and its attached corresponding metadata, and
the additional digital image and its attached corresponding metadata.

17. The system of claim 10, wherein the server is operable to:
communicate with a first wireless device and with a second wireless device;
receive a first portion of the metadata corresponding to the digital image from a first application in the first wireless device; and
receive a second portion of the metadata corresponding to the digital image from a second application in the second wireless device.

18. The system of claim 10, wherein the server is operable to
generate the information for the GUI corresponding to the application in the wireless device.

19. A system, comprising an electronic device operable to:
communicate with a plurality of image capture devices participating in a same photographic session;
store a plurality of digital images received from the plurality of cameras;
receive a digital image from two or more of the image capture devices;
attach to each received digital image corresponding metadata, wherein at least a portion of the metadata corresponding to each digital image is stored in the electronic device prior to reception of the digital images; and
transmit each digital image and the attached corresponding metadata to one or both of a social media outlet and a website;
transmit information for a graphical user interface (GUI) corresponding to an application in a wireless device to the wireless device for display on the GUI corresponding to the application in the wireless device, wherein the electronic device is operable to communicate with the wireless device; and
receive from the wireless device one or more of at least a portion of the metadata corresponding to the digital image, digital image approval information, and digital image selection information, each of which is provided by a user of the wireless device in response to the GUI displayed.

20. The system of claim 19, wherein the electronic device is operable to
receive additional metadata corresponding to each digital image from the application in the wireless device.

\* \* \* \* \*